(12) United States Patent
Sundararajan et al.

(10) Patent No.: US 10,104,624 B2
(45) Date of Patent: Oct. 16, 2018

(54) TECHNIQUES FOR ADJUSTING TRANSMIT POWER IN WIRELESS COMMUNICATIONS

(71) Applicant: QUALCOMM Incorporated, San Diego, CA (US)

(72) Inventors: Jay Kumar Sundararajan, San Diego, CA (US); Hao Xu, Beijing (CN); Jing Jiang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/650,622

(22) Filed: Jul. 14, 2017

(65) Prior Publication Data

US 2018/0132189 A1 May 10, 2018

Related U.S. Application Data

(60) Provisional application No. 62/417,502, filed on Nov. 4, 2016, provisional application No. 62/456,560, filed on Feb. 8, 2017.

(51) Int. Cl.

| | |
|---|---|
| *H04W 52/04* | (2009.01) |
| *H04W 52/18* | (2009.01) |
| *H04W 16/32* | (2009.01) |
| *H04W 52/14* | (2009.01) |
| *H04W 52/32* | (2009.01) |
| *H04W 84/04* | (2009.01) |
| *H04W 88/10* | (2009.01) |
| *H04W 52/26* | (2009.01) |
| *H04W 52/48* | (2009.01) |

(52) U.S. Cl.
CPC ........... *H04W 52/18* (2013.01); *H04W 16/32* (2013.01); *H04W 52/143* (2013.01); *H04W 52/146* (2013.01); *H04W 52/265* (2013.01); *H04W 52/325* (2013.01); *H04W 52/48* (2013.01); *H04W 84/045* (2013.01); *H04W 88/10* (2013.01)

(58) Field of Classification Search
CPC .......................... H04W 52/04; H04W 72/1221
USPC ...................... 455/522, 69, 67.11, 452.1, 509
See application file for complete search history.

(56) References Cited

U.S. PATENT DOCUMENTS

| | | | | |
|---|---|---|---|---|
| 2011/0286391 | A1* | 11/2011 | Chen | .................... H04W 52/265 370/328 |
| 2016/0205631 | A1* | 7/2016 | Chen | ..................... H04W 52/04 455/522 |
| 2016/0323887 | A1 | 11/2016 | Patel et al. | |
| 2017/0201400 | A1 | 7/2017 | Park et al. | |

OTHER PUBLICATIONS

International Search Report and Written Opinion—PCT/US2017/055644—ISA/EPO—dated Nov. 20, 2017 (14 total pages).

\* cited by examiner

*Primary Examiner* — John J Lee
(74) *Attorney, Agent, or Firm* — Arent Fox, LLP

(57) ABSTRACT

Various aspects described herein relate to controlling transmit power in wireless communications. It can be determined, at a user equipment (UE), that communications with a base station are configured over a connection associated with a threshold reliability. Based at least in part on this determination, a configured transmit power can be adjusted to an adjusted transmit power for a transmission attempt over the connection. Data can then be transmitted at the adjusted transmit power.

26 Claims, 7 Drawing Sheets

TECHNIQUES FOR ADJUSTING TRANSMIT POWER IN WIRELESS COMMUNICATIONS

CLAIM OF PRIORITY UNDER 35 U.S.C. § 119

The present application for patent claims priority to Provisional Application No. 62/417,502, entitled "TECHNIQUES FOR ADJUSTING TRANSMIT POWER IN WIRELESS COMMUNICATIONS" filed Nov. 4, 2016, and Provisional Application No. 62/456,560, entitled "TECHNIQUES FOR ADJUSTING TRANSMIT POWER IN WIRELESS COMMUNICATIONS" filed Feb. 8, 2017, which are assigned to the assignee hereof and hereby expressly incorporated by reference herein for all purposes.

BACKGROUND

Described herein are aspects generally related to communication systems, and more particularly, to adjusting transmit power in wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired. Preferably, these improvements should be applicable to other multi-access technologies and the telecommunication standards that employ these technologies.

In wireless communication systems employing LTE, higher reliability can be achieved by using a retransmission scheme, such as hybrid automatic repeat/request (HARQ), to allow data that is not received by a node to be retransmitted a number of times in an attempt to improve the likelihood that the data is received. In addition, in legacy LTE, a plurality of UEs served by a particular evolved Node B (eNB, eNodeB, base station, etc.) may be scheduled with resources for communicating with the eNodeB over one or more channels using transmission time intervals (TTI) on the order of about 1 millisecond subframe. As UE capabilities and demand for bandwidth increases, lower latency in communications may be desired while maintaining or increasing a level of reliability for the communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for controlling transmit power in wireless communications is provided. The method includes determining, at a user equipment (UE), that communications with a base station are configured over a connection associated with a threshold reliability, and adjusting a configured transmit power to an adjusted transmit power for a transmission attempt over the connection. Adjusting the configured transmit power is based at least in part on determining that the connection is associated with the threshold reliability. The method also includes transmitting data at the adjusted transmit power.

In another example, a method for controlling transmit power in wireless communications is provided. The method includes generating, at a base station, a configuration for adjusting a transmit power for transmission of data over a connection determined to be associated with a threshold reliability. The method also includes transmitting the configuration to a UE, and receiving, from the UE, one or more transmissions at an adjusted transmit power based at least in part on the configuration.

In another example, an apparatus for wireless communication is provided. The apparatus includes a transceiver for communicating one or more wireless signals via one or more antennas, a memory configured to store instructions, and one or more processors communicatively coupled with the transceiver and the memory. The one or more processors are configured to determine that communications with a base station are configured over a connection associated with a threshold reliability, adjust a configured transmit power to an adjusted transmit power for a transmission attempt over the connection, where adjusting the configured transmit power is based at least in part on determining that the connection is associated with the threshold reliability, and transmit data at the adjusted transmit power.

In another example, an apparatus for wireless communication is provided. The apparatus includes means for determining, at a user equipment (UE), that communications with a base station are configured over a connection associated with a threshold reliability, means for adjusting a configured transmit power to an adjusted transmit power for a transmission attempt over the connection, where adjusting the configured transmit power is based at least in part on determining that the connection is associated with the threshold reliability, and means for transmitting data at the adjusted transmit power.

In yet another example, a computer-readable medium including code executable by one or more processors for wireless communications is provided. The code includes code for determining, at a user equipment (UE), that communications with a base station are configured over a connection associated with a threshold reliability, code for adjusting a configured transmit power to an adjusted transmit power for a transmission attempt over the connection, where adjusting the configured transmit power is based at least in part on determining that the connection is associated with the threshold reliability, and code for transmitting data at the adjusted transmit power To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
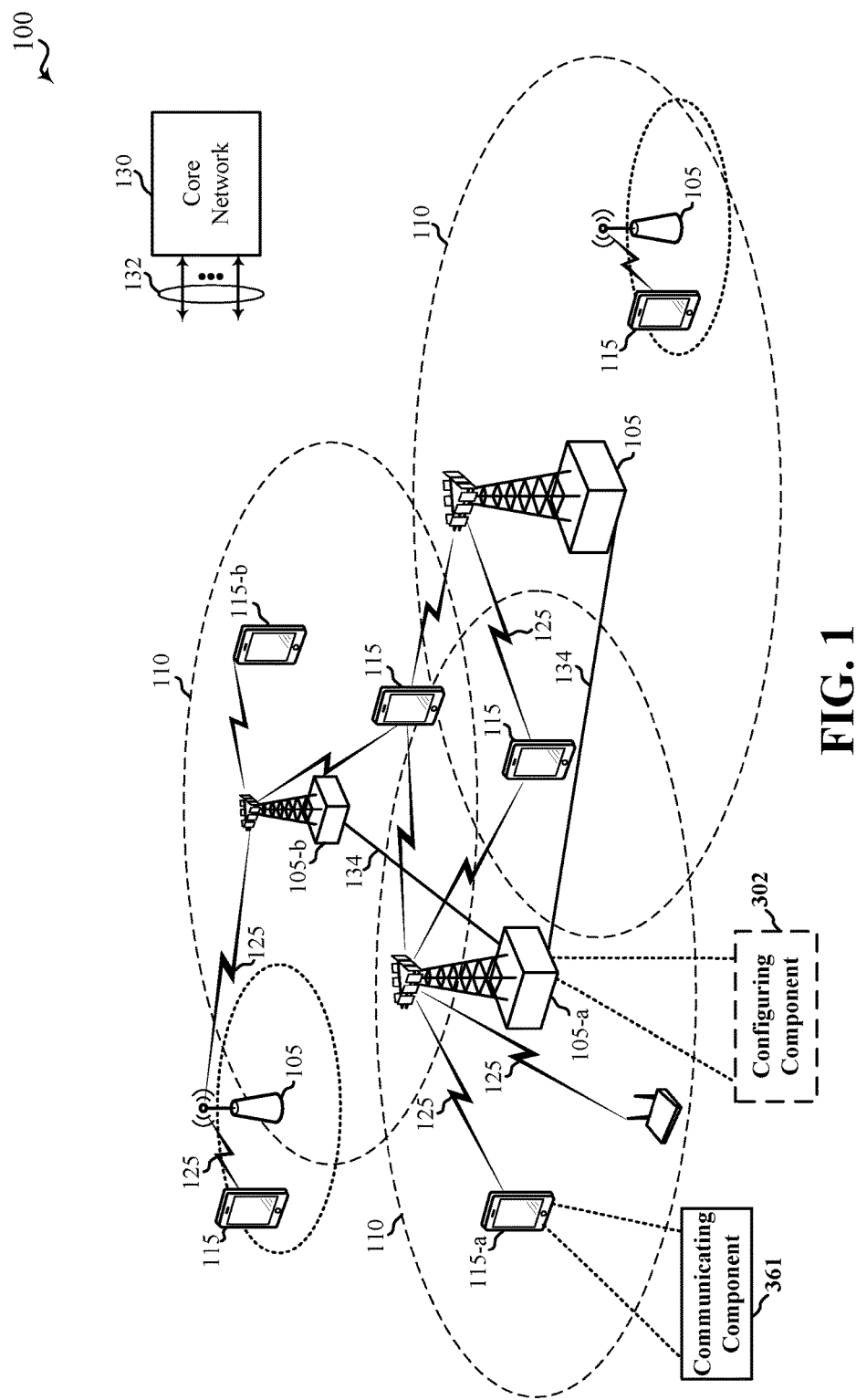
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to adjusting transmit power in wireless communications. For example, a transmit power for transmitting signals, which may include a packet or other unit of data (generally referred to herein as "data," a "packet," or a "data packet" for ease of explanation), can be adjusted based on one or more parameters indicating when transmission of the packet is set to expire, based on whether the packet is a new transmission or a retransmission, based on whether open-loop or closed-loop power control is being utilized, based on a transmit power control (TPC) command interpretation, based on whether the channel is a control or a data channel, based on a type of control data, etc. In an example, the transmit power can be adjusted based on one or more parameters including a transmission or retransmission attempt index for the packet, a packet deadline time after which transmission of the packet expires, a number of transmission or retransmission attempts remaining for the packet, a queue length for a transmission buffer of packets, etc. In an example, the closer the transmission or retransmission attempt is to the deadline, the higher the transmit power can be adjusted in an attempt to improve successful transmission and receipt of the packet. For example, as the transmission or retransmission attempt index increases, the packet deadline decreases, the number of remaining transmission or retransmission attempts decreases, or queue length increases, the transmit power can be adjusted (e.g., increased or decreased). In another example, the transmit power can be adjusted based on one or more parameters indicating whether data for transmission is a new transmission or a retransmission (e.g., a new data indicator (NDI) received from the base station), a transmission counter, and/or other power control or management parameters.

In an example, a user equipment (UE) can be configured to adjust transmit power in this regard based on a configuration stored at the UE, a configuration received from one or more base stations, etc. For example, the configuration may indicate fixed or variable transmit power adjustments based on one or more values of the one or more parameters. Thus, for example, the UE can adjust transmit power based on the one or more parameters without requiring power adjustment commands from the one or more base stations.

In one specific example, a low latency communication technology, such as an ultra-low latency (ULL) communication technology, ultra-reliable low-latency communication (URLLC) or other 5G new radio (NR) technologies, etc. may be based on a legacy wireless communication technology, such as third generation partnership project (3GPP) long term evolution (LTE), but may utilize different length transmission time intervals (TTI) (e.g., the ULL or URLLC communication technology may have a shorter TTI duration than the legacy communication technology). For example, a legacy LTE technology may utilize a TTI having a duration of a subframe defined in LTE (e.g., 1 millisecond), where a ULL LTE technology can be based on a TTI having a duration less than a subframe (e.g., a division of a subframe, such as one symbol, two symbols, a subframe slot, etc.). In this regard, a lower latency in communications is achieved by the shorter, more frequent TTI.

In addition, some wireless communication technologies that utilize the lower latency TTIs, such as URLLC, may have additional specifications for allowable latency in transmitting/retransmitting communications and/or reliability that can be achieved for the communications. It may be difficult for a UE to attain these specifications given the lower latency in communications, as previous mechanisms for interference management, power control, rate control, etc. may utilize feedback loops that can incur round-trip delays for associated communications transmitted between the UE and one or more base stations. For example, in LTE, UE transmit power is controlled by the network (e.g., by one or more base stations) and relevant parameters are conveyed to the UE using control messages. For example, the network can determine to set the transmit power for the UE to achieve a high received power of communications from the UE at the serving base station and manageable interference power (e.g., below a threshold power) at neighboring base stations without exceeding a maximum transmit power of the UE. Open-loop power control in LTE can be used to set the UE transmit power based on pathloss and bandwidth allocation, and is controlled by parameters signaled by the base station (e.g., via system information broadcast (SIB), radio resource control (RRC) signaling, etc.). Closed-loop power control in LTE can allow the network to further adjust the UE transmit power using power control commands sent to the UE, where the UE maintains one or more power control loops, which can accumulate and apply received power control commands. In some examples in LTE, 1 or 2 bits can be used to indicate decibel (dB) levels for adjusting power in TPC commands (e.g., −1 dB/+1 dB for 1 bit, +3 dB/+1 dB/0 dB/−1 dB for 2-bit, etc.).

In URLLC, for example, multiple retransmission attempts may be used to meet the reliability specifications. Turbo-hybrid automatic repeat/request (HARD) is proposed to provide additional frequency/time resources for allocating to a URLLC packet (e.g., especially when it is close to delay bound). In Turbo-HARQ, the additional resource may be assigned by a base station using downlink control information (DCI) for downlink and uplink URLLC. Channel state information (CSI) can also be enhanced assuming different interference profiles. In addition, UE transmit power may be adjusted such that the transmit power for successive retransmission attempts can be increased to a higher value (e.g., as a packet deadline nears), but using legacy mechanisms for adjusting transmit power can require transmission of power control commands to adjust the UE's power, which may incur delay. Such delays may not be acceptable in URLLC in attempting to meet the reliability specifications, and may cause a packet to miss a packet deadline and expire. Accordingly, described herein are aspects related to adjusting transmit power, at the UE, based on the one or more parameters related to when transmission of the packet is set to expire, whether the packet is a new transmission or retransmission, etc., which may mitigate the need for control signaling of legacy mechanisms as well as delay associated therewith.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a configuring component 302 configured to possibly provide a configuration to one or more UEs 115 for determining a transmit power for transmitting a packet in one or more signals based on one or more parameters related to a time the packet is set to expire, based on whether the packet is a new transmission or a retransmission, based on whether open-loop or closed-loop power control is being utilized, based on a TPC command interpretation, etc. Similarly, one or more of UEs 115 may include a communicating component 361 configured to adjust a transmit power for transmitting a packet in one or more signals to one or more access points 105, where adjusting the transmit power may be based on one or more parameters related to a time the packet is set to expire, based on whether the packet is a new transmission or a retransmission, based on whether open-loop or closed-loop power control is being utilized, based on a TPC command interpretation, etc. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-*a* may communicate with access point 105-*a* on both a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point 105-*b* and UE 115-*b* may communicate on the second hierarchical layer through transmissions of subframes of the second subframe type. Access point 105-*b* may transmit communications related to the first or second hierarchical layer only or may transmit communications for both the first and second hierarchical layers. Where an access point 105-*b* supports both the first and second hierarchical layers, communicating component 361 can be configured to prioritize communications received from the access point 105-*b* that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A, ULL LTE, URLLC, etc. communication technologies, the terms evolved Node B (eNodeB or eNB) may be generally used to describe the access points 105. The wireless communications system 100 may be a Heterogeneous LTE/LTE-A/ULL LTE/URLLC network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

In examples described further herein, a UE 115 can adjust a transmit power, via communicating component 361, for transmitting a packet in a signal to one or more access points 105. The UE 115 can adjust the transmit power based at least in part on one or more parameters related to a deadline for transmitting the packet before it is set to expire, such as a transmission/retransmission attempt index, a time until the packet deadline, a number of transmission/retransmission attempts remaining, a queue length of a transmission buffer at the UE 115, etc. For example, the UE 115 can increase the transmit power at each transmission/retransmission attempt, as the packet nears its packet deadline, as the queue length of the transmission buffer increases, etc., in an attempt to improve reliability of communicating the packet (e.g., to meet specifications of a URLLC communication system). In an example, UE 115 can adjust the configured transmit power based on whether a packet being transmitted from the UE 115 is a new transmission or a retransmission, based on whether open-loop or closed-loop power control is being utilized, based on a TPC command interpretation, etc. In an example, UE 115 may determine whether a packet being transmitted is a new transmission or retransmission based on a NDI or flag received from access point 105 and/or a transmission counter at the UE 115. In an additional example, access point 105 can configure the UE 115, via configuring component 302, with a configuration indicating parameters for adjusting the transmit power.

Figure 2:
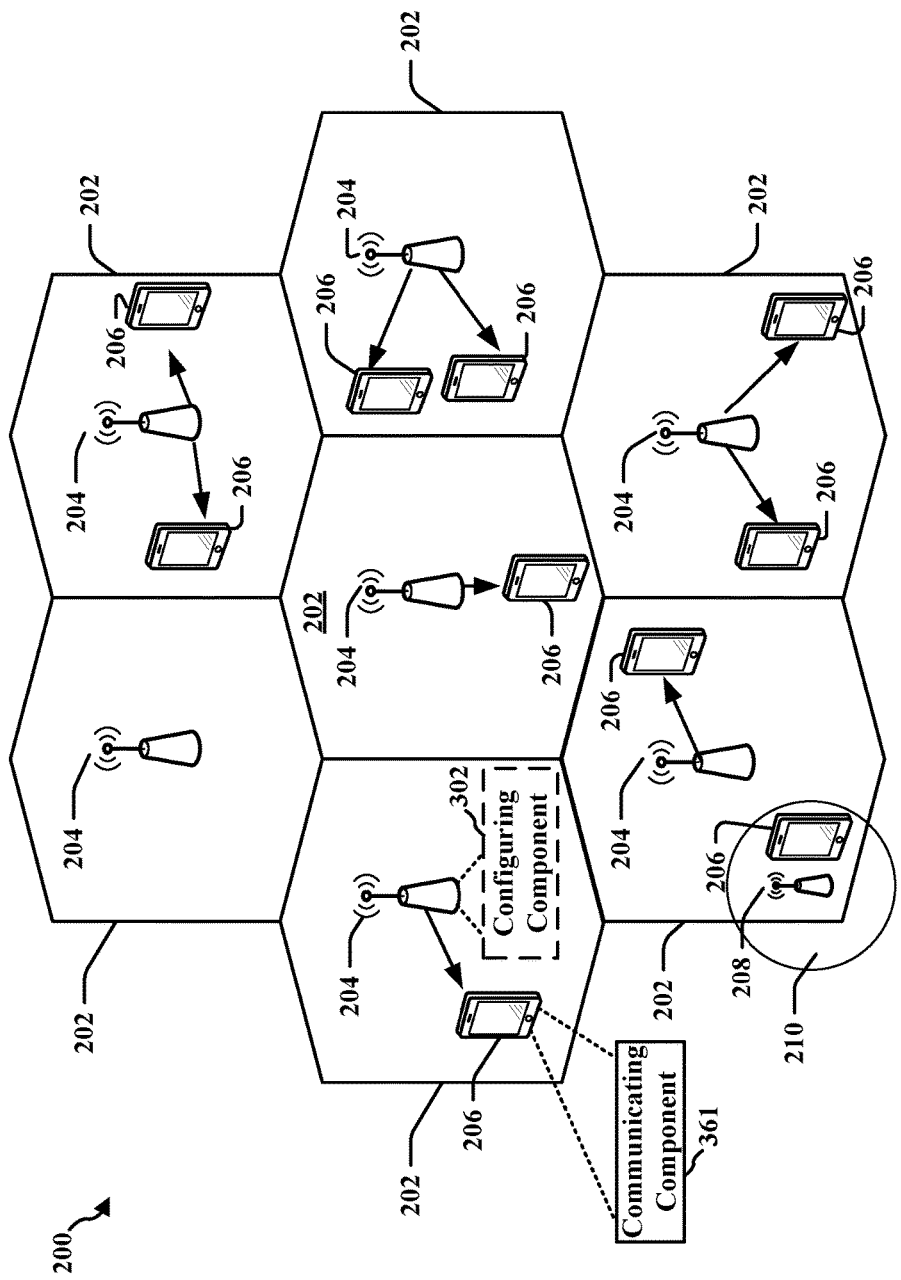
FIG. 2 is a diagram illustrating an example of an access network.

FIG. 2 is a diagram illustrating an example of an access network 200 in an LTE, ULL LTE, URLLC, etc. network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include a configuring component 302 configured to possibly provide a configuration to one or more UEs 206 for determining a transmit power for transmitting a packet in one or more signals based on one or more parameters related to a time the packet is set to expire, based on whether the packet is a new transmission or a retransmission, based on whether open-loop or closed-loop power control is being utilized, based on a TPC interpretation, etc. Similarly, one or more of UEs 206 may include a communicating component 361 configured to adjust a transmit power for transmitting a packet in one or more signals to one or more eNBs 204, 208, where adjusting the transmit power is based on one or more parameters related to a time the packet is set to expire, based on whether the packet is a new transmission or a retransmission, based on whether open-loop or closed-loop power control is being utilized, based on a TPC command interpretation, etc. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE, ULL LTE, URLLC, etc. applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein may be well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204, 208 may have multiple antennas supporting MIMO technology. The use of MIMO technology enables the eNBs 204, 208 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204, 208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
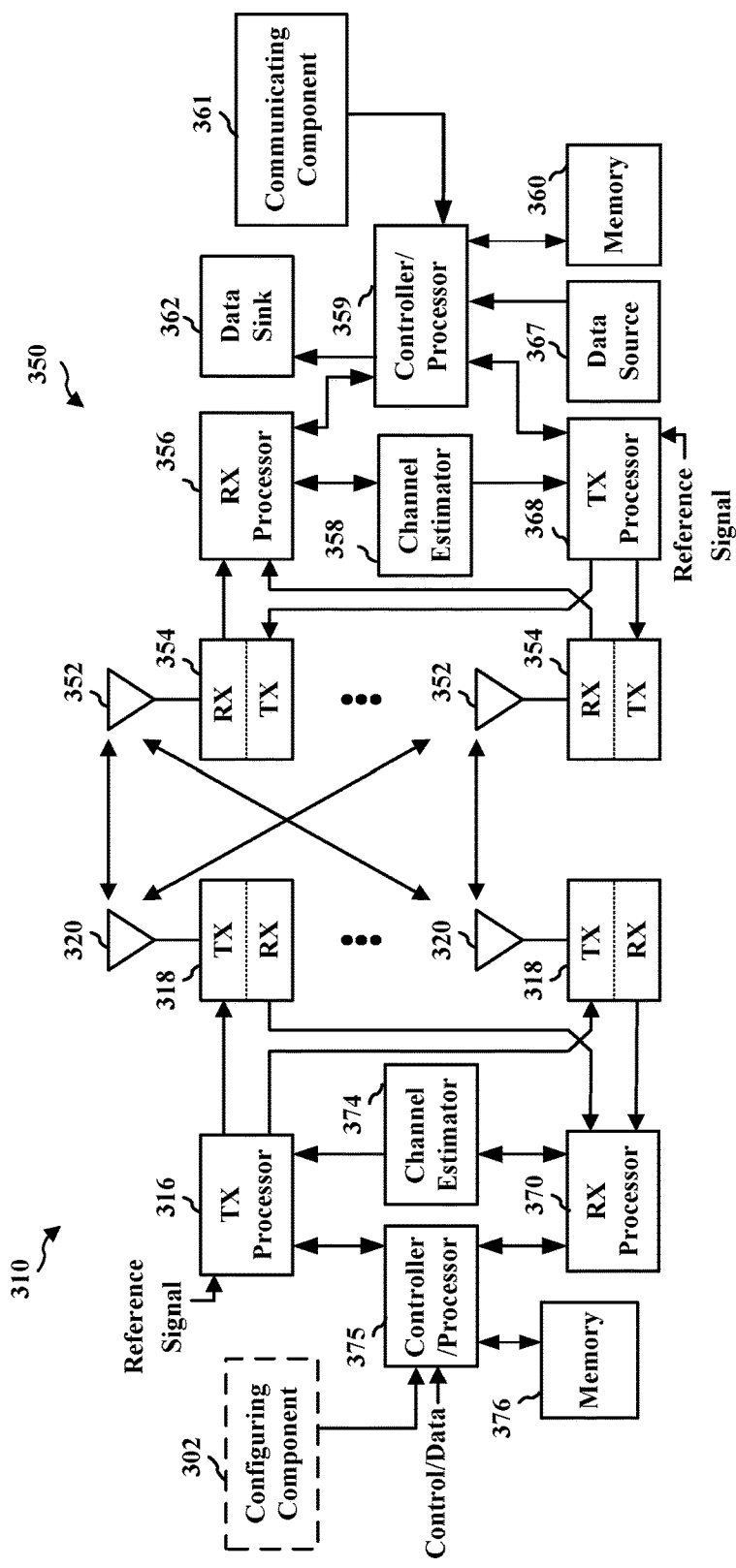
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARD) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

In addition, eNB 310 may include a configuring component 302 configured to possibly provide a configuration to one or more UEs 115 for determining a transmit power for transmitting a packet in one or more signals based on one or more parameters related to a time the packet is set to expire, based on whether the packet is a new transmission or a retransmission, based on whether open-loop or closed-loop power control is being utilized, based on a TPC command interpretation, etc. Though configuring component 302 is shown as coupled with controller/processor 375, substantially any processor of an eNB 310 can provide the functions of the configuring component 302 and/or its related components described herein (e.g., in conjunction with controller/processor 375, memory 376, or otherwise). For example, TX processor 316 and/or RX processor 370 can additionally or alternatively provide one or more functions of configuring component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In addition, UE 350 may include a communicating component 361 configured to adjust a transmit power for transmitting a packet in one or more signals to one or more eNBs 310, where adjusting the transmit power is based on one or more parameters related to a time the packet is set to expire, based on whether the packet is a new transmission or a retransmission, based on whether open-loop or closed-loop power control is being utilized, based on a TPC command interpretation, etc. Though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
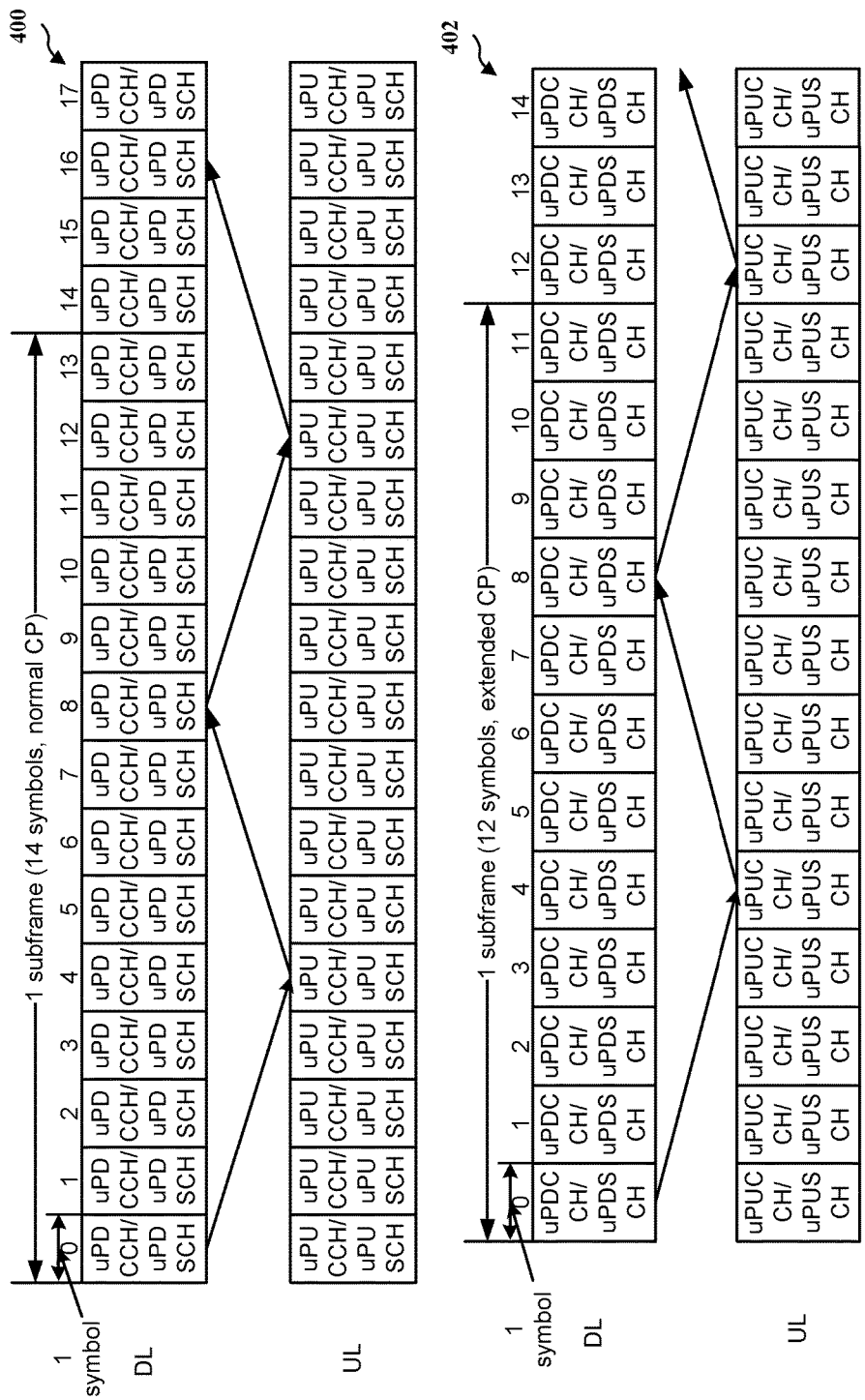
FIG. 4 is a diagram illustrating examples of timelines for ultra low latency (ULL) bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe, though in other examples the ULL timelines may use TTIs that are two symbols, one slot, etc. in duration. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, some symbols within a given subframe can be allocated for downlink communications (e.g., uPDCCH/uPDSCH) while other symbols are allocated for uplink communications (e.g., uPUCCH/uPUSCH).

Figure 5:
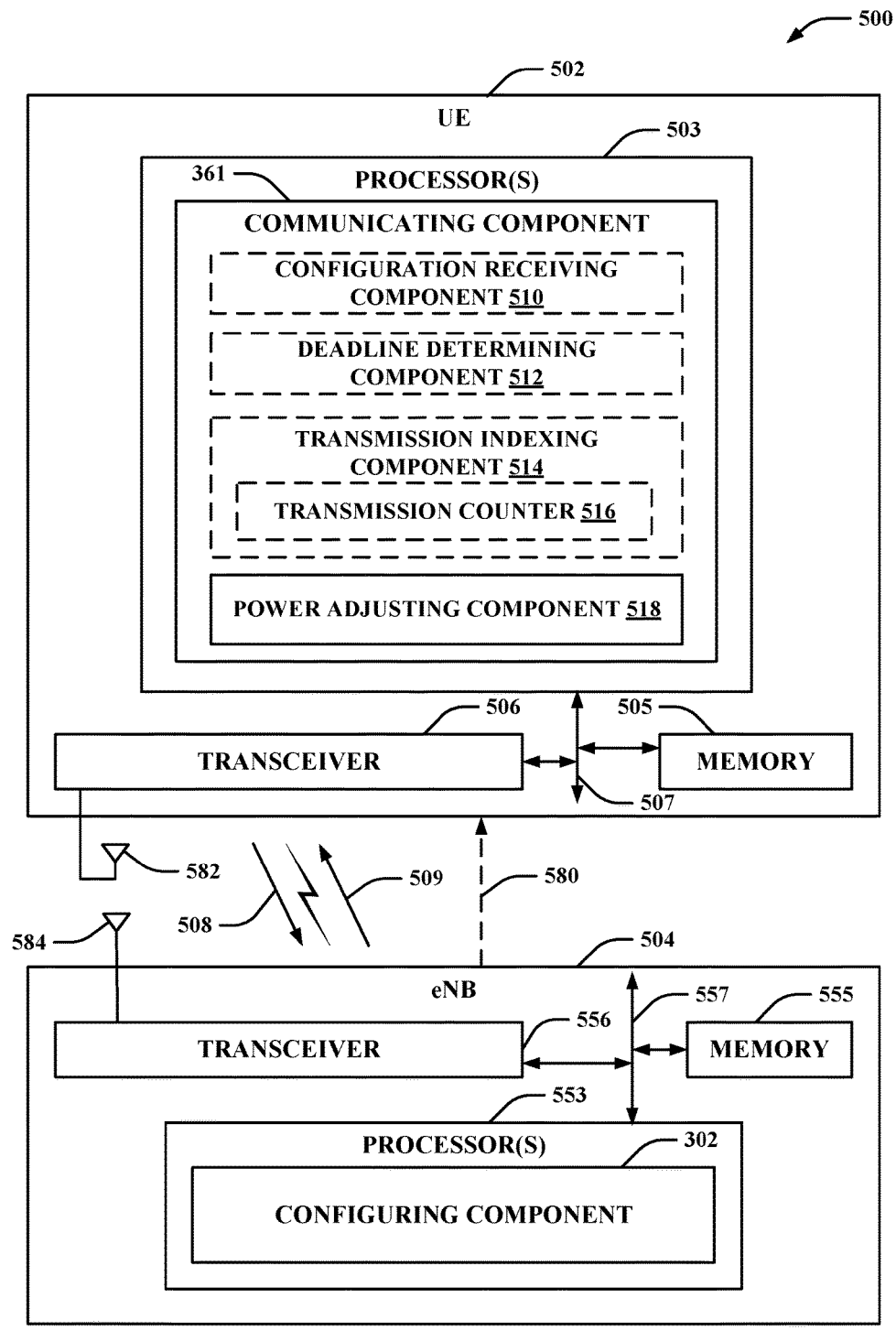
FIG. 5 is a diagram illustrating an example of a system for adjusting transmit power in accordance with aspects described herein.
Figure 6:
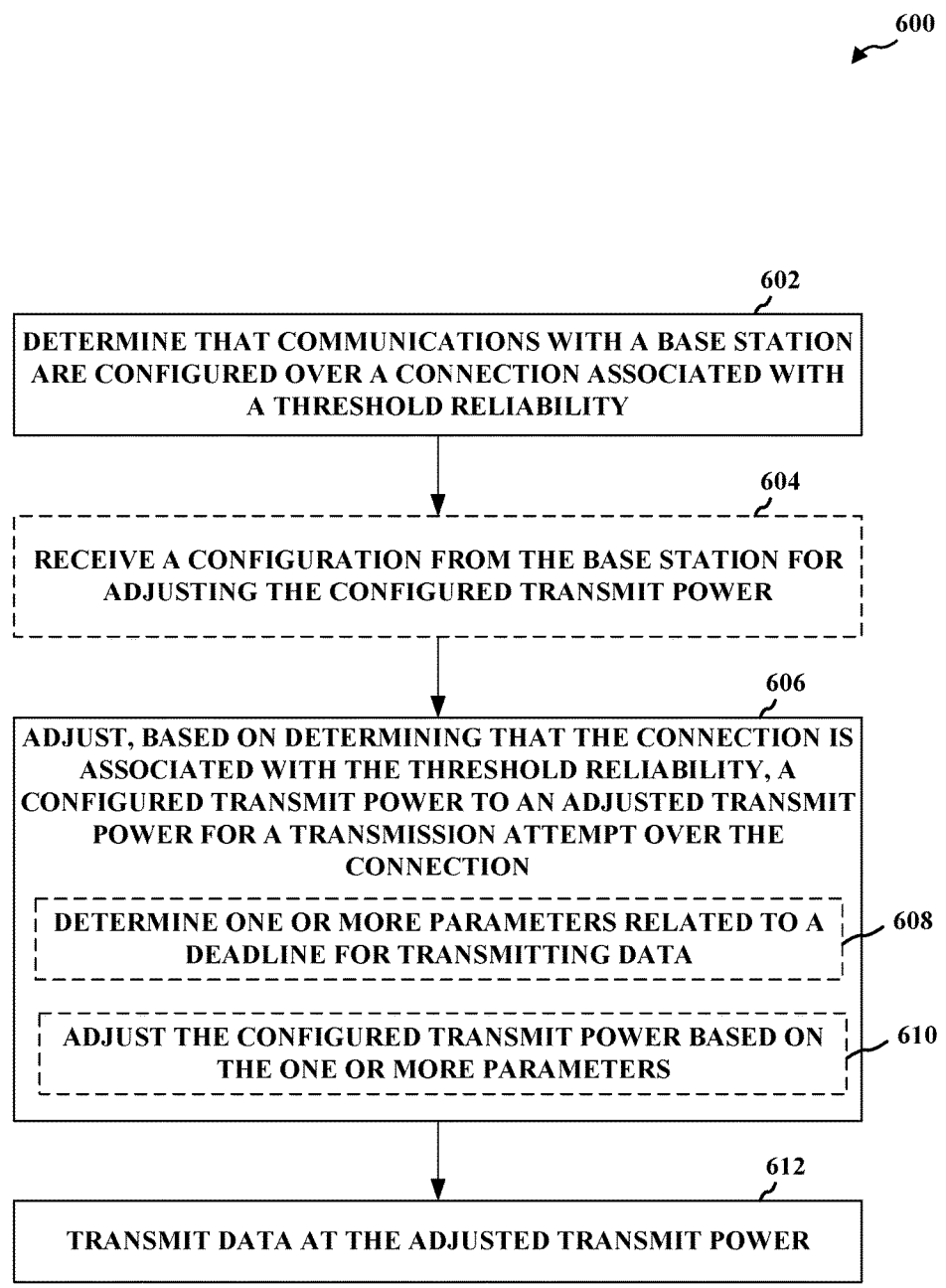
FIG. 6 is a flow chart of an example of a method for adjusting transmit power in accordance with aspects described herein.
Figure 7:
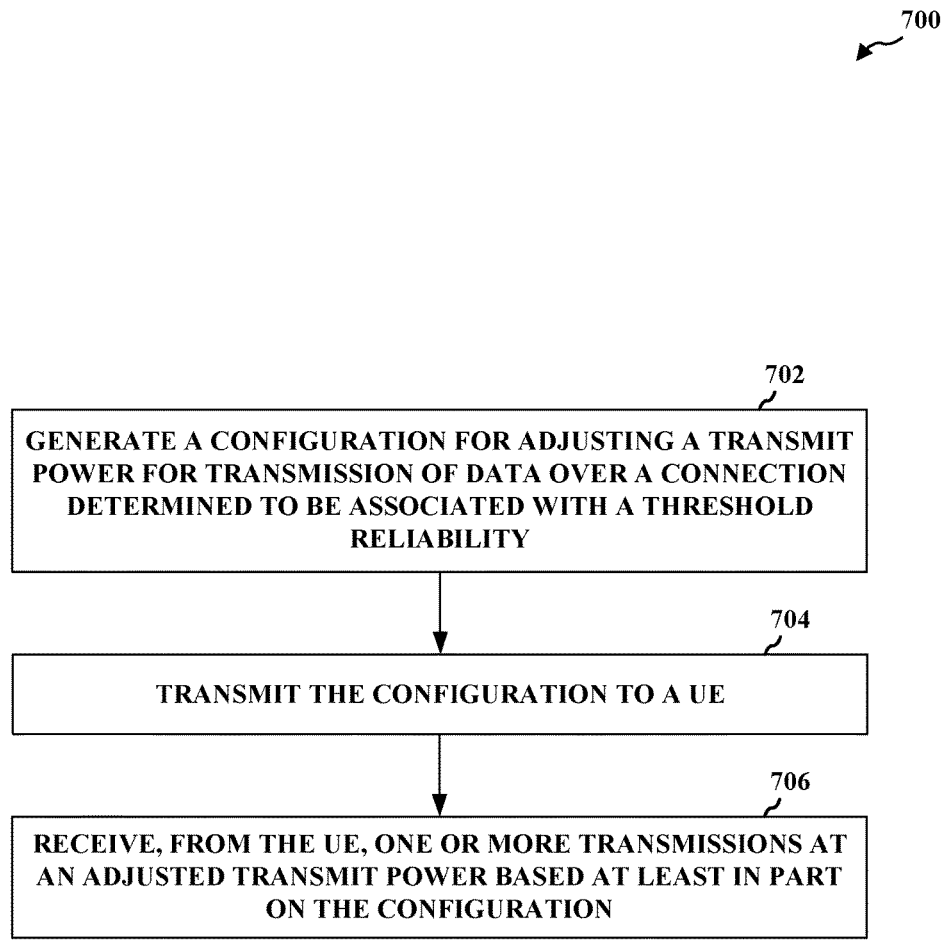
FIG. 7 is a flow chart of an example of a method for providing a configuration for adjusting transmit power in accordance with aspects described herein.

Referring to FIGS. 5-7, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 5 illustrates an example of a system 500 for adjusting transmit power for transmitting wireless communications. System 500 includes a UE 502 that communicates with an eNB 504 to access a wireless network, examples of which are described in FIGS. 1-3 (e.g., access points 105, eNB 204, small cell eNB 208, eNB 310, UEs 115, 206, 350, etc.), above. In an aspect, eNB 504 and UE 502 may establish one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources, as described further herein. Moreover, for example, eNB 504 and UE 502 may establish one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources, as described herein.

In an example, the communication resources related to a lower latency communication technology, such as ULL LTE, URLLC, etc., can be based on a shortened timeline (e.g., a timeline having a TTI that is less than a subframe in duration, such as the timelines 400, 402 in FIG. 4 or URLLC timelines). In examples described further herein, UE 502 can adjust a transmit power for transmitting communications to the eNB 504 based on one or more parameters related to deadline before a packet is set to expire. In another example, UE 502 can determine the communication resources, for example, transmit power, based on whether the data to be transmitted from the UE 502 is a new transmission or a retransmission (e.g., based at least on a NDI received from the eNB 504 or a transmission counter at the UE 502). In another example, UE 502 can determine the transmit power, for example, based on whether open-loop or closed power control is being used, based on TPC interpretation at the UE 502, etc.

In an aspect, UE 502 may include one or more processors 503 and/or a memory 505 that may be communicatively coupled, e.g., via one or more buses 507, and may operate in conjunction with or otherwise implement a communicating component 361 for adjusting a transmit power for transmitting a packet in one or more signals to one or more eNBs 204, 208, where adjusting the transmit power is based on one or more parameters, which may relate to a time the packet is set to expire, an indication of whether the packet is a new transmission or a retransmission, based on whether open-loop or closed-loop power control is being utilized, based on TPC interpretation, etc. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by an optional configuration receiving component 510 for possibly receiving, from an eNB, a configuration for determining an adjustment to transmit power for transmitting/retransmitting a packet based on one or more parameters associated with a deadline for transmitting the packet, a NDI received from the eNB, a TPC received from the eNB, etc. In an aspect, for example, configuration receiving component 510 may include hardware (e.g., one or more processor modules of the one or more processors 503) and/or computer-readable code or instructions stored in memory 505 and executable by at least one of the one or more processors 503 to perform the specially configured configuration receiving operations described herein.

Further, for instance, the one or more processors 503 and/or memory 505 may execute actions or operations defined by an optional deadline determining component 512 for determining one or more parameters associated with a deadline for transmitting a packet. In an aspect, for example, deadline determining component 512 may include hardware (e.g., one or more processor modules of the one or more processors 503) and/or computer-readable code or instructions stored in memory 505 and executable by at least one of the one or more processors 503 to perform the specially configured deadline determining operations described herein. Further, for instance, the one or more processors 503 and/or memory 505 may execute actions or operations defined by an optional transmission indexing component 514 for determining an index associated with transmitting a packet, which may include determining whether the transmission is a new transmission, a retransmission, which may include determining an index of the retransmission, etc. For example, transmission indexing component 514 may include a transmission counter 516 to track a number of retransmission attempts based on HARQ feedback received at the UE 502. In an aspect, for example, transmission indexing component 514 may include hardware (e.g., one or more processor modules of the one or more processors 503) and/or computer-readable code or instructions stored in memory 505 and executable by at least one of the one or more processors 503 to perform the specially configured transmission indexing operations described herein. Further, for instance, the one or more processors 503 and/or memory 505 may execute actions or operations defined by a power adjusting component 518 for adjusting a transmit power for transmitting a packet in a signal based on the one or more parameters associated with the deadline for transmitting the packet, a NDI received from the eNB, a TPC received from the eNB, etc. In an aspect, for example, power adjusting component 518 may include hardware (e.g., one or more processor modules of the one or more processors 503) and/or computer-readable code or instructions stored in memory 505 and executable by at least one of the one or more processors 503 to perform the specially configured power adjusting operations described herein.

Similarly, in an aspect, eNB 504 may include one or more processors 553 and/or a memory 555 that may be communicatively coupled, e.g., via one or more buses 557, and may operate in conjunction with or otherwise implement a configuring component 302 for possibly providing a configuration to one or more UEs 206 for determining a transmit power for transmitting a packet in one or more signals based on one or more parameters related to a time the packet is set to expire, whether the packet is a new transmission or a retransmission, whether open-loop or closed-loop power control is being utilized, a TPC interpretation, etc. For example, the various functions related to configuring component 302 may be implemented or otherwise executed by one or more processors 553 and, in an aspect, can be executed by a single processor, while in other aspects, different ones of the functions may be executed by a combination of two or more different processors, as described above. In one example, the one or more processors 553 and/or memory 555 may be configured as described in examples above with respect to the one or more processors 503 and/or memory 505 of UE 502. In an example, the one or more processors 553 and/or memory 555 may execute actions or operations defined by configuring component 302 or its subcomponents.

In an example, transceivers 506, 556 may be configured to transmit and receive wireless signals through one or more antennas 582, 584 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

FIG. 6 illustrates an example of a method 600 for adjusting (e.g., by a UE) transmit power for transmitting one or more signals, which may include one or more packets, to a base station. In method 600, blocks indicated as dashed boxes represent optional steps.

At Block 602, the UE may determine that communications with a base station are configured over a connection associated with a threshold reliability. In an aspect, communicating component 361, e.g., in conjunction with processor(s) 503, memory 505, and/or transceiver 506, can determine that communications with the base station (e.g., eNB 504) are configured over a connection associated with a threshold reliability. For example, communicating component 361 can determine that the connection is configured for URLLC or other wireless communication technologies that are based on at least a threshold reliability. For example, where communicating component 361 determines that the connection is configured for enhanced mobile broadband (eMBB), power control management may occur without employing aspects described herein (e.g., without modifying transmission power adjustment based on packet deadline related parameters, without regard for whether the packet is a new transmission or retransmission, etc.). In an example, the threshold reliability may be correlated with a deadline for providing data at the threshold reliability, such that the threshold reliability relates to communicating data (e.g., data packets) in terms of achieving a fraction of data within a specified deadline. In another example, communicating component 361 can determine a reliability metric associated with the connection (e.g., based on one or more parameters received from the eNB 504) as achieving the threshold reliability (e.g., a fraction of data, a specified deadline, etc.). In either case, for example, communicating component 361 can determine that the connection is configured for providing at least the threshold reliability based on one or more parameters of the connection (e.g., the type of wireless communication technology, the reliability specification, etc.), which may be specified in a configuration for the connection. For example, eNB 504 may indicate the one or more parameters of the connection in a resource grant (e.g., downlink or uplink grant) for the connection, in a command to activate a component carrier corresponding to the connection, in higher layer signaling (e.g., RRC signaling), in broadcasting system information (e.g., a SIB), etc.

Optionally, at Block 604, the UE can receive a configuration from the base station for adjusting the configured transmit power. In an aspect, configuration receiving component 510, e.g., in conjunction with processor(s) 503, memory 505, and/or transceiver 506, can receive the configuration from the base station (e.g., eNB 504) for adjusting the configured transmit power. In an example, the configuration can include a transmit power profile that specifies how much power the UE 502 is to use in transmitting data based on how close the data is to its deadline for expiration. For example, in this regard and as described further herein, the configuration may indicate transmit power adjustment values and/or associated parameter values for applying the transmit power adjustment values. For example, the transmit power adjustment values in the configuration may correspond to a factor to apply to a current transmit power or an otherwise configured transmit power, which may be a fixed or variable factor, a fixed or variable adjustment value to add to or subtract from a current transmit power or an otherwise configured transmit power, a fixed transmit power, etc. Additionally, the transmit power adjustment values may be the same for each transmission/retransmission of data, or different as the number of retransmissions of the data increases.

In one example of closed-loop power control, UE 502 and/or configuration receiving component 510 may receive a TPC from eNB 504 for adjusting the configured transmit power. The TPC may be a 1-bit TPC, a 2-bit TPC, etc. to indicate the transmit power adjustment value, which may be interpreted differently by UE 502 for adjusting transmit power depending on whether UE 502 is transmitting a new transmission or a retransmission. In one example of open-loop power control, UE 502 and/or configuration receiving component 510 may receive power control parameters from eNB 504 for adjusting the configured transmit power at UE 502. UE 502 and/or configuration receiving component 510 may receive the configuration as the TPC and/or as power control parameters, which may be cell-specific or UE-specific, via a RRC or higher layer signaling, SIB or other broadcast message, etc., where the power control parameters indicate a factor or adjustment for the TPC based on whether the packet transmission is a new transmission or retransmission, a retransmission index, etc. In both closed-loop and open-loop controls, UE 502 may adjust the configured transmit power separately for UL control and data channels, as described herein. This can provide flexibility for managing transmit power at a UE 502.

Furthermore, in an example, associated parameter values in the configuration may be indicated for parameters such as a transmission or retransmission attempt index (e.g., a HARQ index) which may be determined based on a transmission counter 516 at the UE 502 or based on a NDI indicated for the packet, a packet deadline after which the packet is set to expire, a number of transmission or retransmission attempts (HARQ transmissions) performed, a queue length of a transmission buffer, etc. Thus, for example, for each of one or more of these parameters, the configuration can indicate one or more transmit power adjustment values (e.g., for any change in a value of the one or more parameters, for ranges in value of the one or more parameters, etc.). In another example, the configuration may not be received from the eNB 504 and may be implemented in instructions in the UE 502, stored in a memory 505 of the UE 502, etc.

At Block 606, the UE can adjust, based on determining that the connection is associated with the threshold reliability, a configured transmit power to an adjusted transmit power for a transmission attempt over the connection. In an aspect, power adjusting component 518, e.g., in conjunction with processor(s) 503, memory 505, and/or transceiver 506, can adjust, based on determining that the connection is associated with the threshold reliability, the configured transmit power to an adjusted transmit power for a transmission attempt over the connection. For example, where the connection is associated with the threshold reliability, power adjusting component 518 can increase the transmit power for transmitting data to improve a likelihood of a receiving device (e.g., eNB 504) receiving the data. For example, power adjusting component 518 can adjust the power based on a transmit power adjustment value without necessarily requiring power adjustment commands from the eNB 504, which can save latency associated with legacy procedures, and can thus be beneficial in networks using lower latency communication technologies.

In an example, in adjusting the configured transmit power at Block 606, optionally at Block 608, the UE can determine one or more parameters related to a deadline for transmitting data. In an aspect, deadline determining component 512, e.g., in conjunction with processor(s) 503, memory 505, and/or transceiver 506, can determine the one or more parameters related to the deadline for transmitting the data. For example, the one or more parameters related to the deadline may be specified for the connection (e.g., in a configuration for the connection received from the eNB 504 in a resource grant, in a component carrier activation command, in RRC signaling, in a system information broadcast (e.g., SIB), etc.).

In an example, the one or more parameters may correspond to a number of transmission (e.g., HARQ transmission) attempts that have been performed for the data, where the data can correspond to a unit of data, such as a data packet that is transmitted in a signal from the UE 502. For example, deadline determining component 512 can determine the number of transmission attempts based at least in part on a NDI (e.g., NDI=1 can indicate one transmission attempt, NDI=0 can indicate a number of transmission attempts greater than one). In another example, deadline determining component 512 can determine the number of transmission attempts based at least in part on a transmission counter 516.

In another example, the one or more parameters may correspond to a time until a packet deadline associated with the data packet, which may be initially specified based on one or more parameters related to the connection and managed by the UE 502 (e.g., using an associated timer). In another example, the one or more parameters may correspond to a number of remaining transmission (e.g., HARQ transmission) attempts until the data packet is expired (e.g., dropped from a buffer without further retransmission attempts), which may be based on a maximum number of transmission attempts configured for the connection and a number of performed attempts. In another example, the one or more parameters may correspond to a queue length of a transmission buffer in communicating component 361 for transmitting data packets to the eNB 504. For example, communicating component 361 can store these parameters, and deadline determining component 512 can obtain one or more of the parameters for determining a transmit power adjustment.

Accordingly, in this example, in adjusting the configured transmit power at Block 606, optionally at Block 610, the UE can adjust the configured transmit power based on the one or more parameters. In an aspect, power adjusting component 518, e.g., in conjunction with processor(s) 503, memory 505, and/or transceiver 506, can adjust the configured transmit power based on the one or more parameters. For example, power adjusting component 518 can determine the adjusted transmit power based on a value of the one or more parameters, detecting a change in the one or more parameters, etc. The adjusted transmit power can be based on a fixed or variable transmit power adjustment value applied as a factor to a current transmit power, a fixed or variable transmit power adjustment value applied as an increment to the current transmit power, a fixed or variable transmit power adjustment value applied as the adjusted transmit power, etc.

For example, power adjusting component 518 can determine a transmit power adjustment value based on a configuration. In one example, as described, the configuration may be received from the base station or eNB 504 at Block 604. In an example, the eNB 504 may provide the configuration when operating in URLLC mode over the connection with UE 502. In an example, the UE 502 may accordingly re-interpret legacy power control messages based on the configuration to adjust transmit power for successive transmission (e.g., HARQ transmission) attempts based on transmit power adjustment values in the configuration. In another example, the configuration may be stored in a memory 505 of UE 502 in instructions for adjusting the transmit power or in a configuration, etc.). In an example, the UE 502 and eNB 504 may have an implicit agreement where, for URLLC operation, the UE applies transmit power adjustments to the transmit power for subsequent transmission (e.g., HARQ transmission) attempts as compared to a prior transmission using a transmit power adjustment value.

In either case, in an example, the configuration may indicate a transmit power adjustment value to be applied (e.g., as a factor for multiplying the current transmit power or as an increment to the current transmit power), or a certain transmit power, at each of a plurality of values of the one or more parameters. In another example, the configuration may indicate a transmit power adjustment value to be applied each time the one or more parameters change in value (e.g., increment 3 decibels (dB) for each HARQ transmission attempt).

In a specific example, the configuration may indicate one or more transmit power adjustment values for a HARQ attempt index (e.g., the transmit power may increase after each HARQ attempt that is not received by the eNB 504). For example, the configuration may indicate a transmit power adjustment value for each specific HARQ attempt index or generally for each time the HARQ attempt index is increased. For example, the configuration may indicate switching a 2-bit TPC from having possible values of +3 dB, +1 dB, 0 dB, −1 dB (e.g., for a first transmission) to having possible values of +5 dB, +3 dB, +1 dB, 0 dB (e.g., for a retransmission). Thus, for example, deadline determining component 512 can determine that the one or more parameters indicate a new transmission, and can accordingly map the possible 2-bit TPC values to +3 dB, +1 dB, 0 dB, −1 dB, or can determine that the one or more parameters indicate a retransmission and can accordingly map the possible 2-bit TPC values to +5 dB, +3 dB, +1 dB, 0 dB (e.g., and/or can map the 2-bit TPC values to other power adjustment values based on the transmission counter 516 value). Then, based on the TPC received by configuration receiving component 510 (e.g., from eNB 504), power adjusting component 518 can determine the transmit power adjustment value based on the TPC value and the mapping. In an example, substantially any transmit parameter adjustment value can be mapped to the possible TPC values (e.g., W, X, Y, Z dB for new transmissions, where W>X>Y>Z, and S, T, U, V dB for retransmissions where S>T>U>V, and where S>W, T>X, U>Y, and V>Z). In these examples, the UE 502 can increment retransmissions at a higher power granularity (e.g., more aggressively) as compared to new transmissions, which may be beneficial as the number of retransmissions before dropping the packet may be limited. In another example, additional mappings can be specified for different values of the transmission counter 516.

Similarly, for example, the configuration may indicate switching a 1-bit TPC. For example, the configuration may indicate switching the 1-bit TPC from having possible values of +1 dB and −1 dB (e.g., for a first transmission) to having possible values of +3 dB and 0 dB (e.g., for a retransmission). For example, configuration receiving component 510 can receive the TPC in a downlink grant, such as a downlink grant for uplink control channel resources (which may include a 1-bit or 2-bit TPC), a downlink grant for uplink data channel resources (which may include a 2-bit TPC), etc. In any case, deadline determining component 512 can determine the HARQ attempt index for a next transmission of the data (e.g., based on NDI and/or transmission counter 516), and power adjusting component 518 can determine and apply the associated transmit power adjustment value to a current transmit power.

In another example, deadline determining component 512 can determine the one or more parameters based on whether the transmission is for multiple packets (e.g., from different carriers), based on whether a group TPC is received, based on a type of data to be transmitted in the packet, etc. For example, power adjusting component 518 can determine to apply a set of transmit power adjustment values to possible TPC values based on deadline determining component 512 determining parameters regarding a downlink transmission on a particular carrier (e.g., the carrier of a primary cell) of multiple configured carriers (e.g., based on whether the downlink transmission on the particular carrier is a new transmission or retransmission, etc.). In another example, power adjusting component 518 can determine to apply a set of transmit power adjustment values to possible TPC values based on deadline determining component 512 determining parameters regarding a combination of two or more carriers (e.g., as a function of downlink transmissions on multiple carriers), etc. In another example, power adjusting component 518 can determine to apply a set of transmit power adjustment values to possible TPC values based on deadline determining component 512 determining that a received TPC corresponds to a group of UEs (e.g., power adjusting component 518 can determine to apply values similar to new transmissions for group TPCs). In another example, power adjusting component 518 can determine to apply a set of power adjustment values to possible TPC values based on deadline determining component 512 determining that a packet to be transmitted carries uplink control information, such as CSI (e.g., power adjusting component 518 can determine to apply transmit power adjustment values similar to new transmissions in this case).

For example, as described, configuration receiving component 510 can receive different sets of open-loop power control parameters for new transmissions and retransmissions, which may be cell-specific, UE-specific, etc. In another example, configuration receiving component 510 can receive a default set of parameters for new transmissions and additional delta parameters for retransmission to apply to the default parameters where an NDI indicates a given transmission is a retransmission. In any case, power adjusting component 518 can apply the appropriate parameters to adjust the transmit power. In addition, for example, power adjusting component 518 may manage different closed-loop operations for new transmissions and retransmissions, as described, which may include receiving different TPCs to apply for new transmissions and retransmissions.

In another specific example, the configuration may indicate a transmit power adjustment value for the data packet deadline (e.g., the transmit power may increase for data packet as they near their data packet deadline). Thus, for example, deadline determining component 512 can determine a time until the data packet deadline, which may be based on a timer initialized for a given data packet being transmitted, as described above. The configuration may indicate a transmit power adjustment value for ranges of the time until the packet deadline, and power adjusting component 518 can determine and apply the associated transmit power adjustment value for the packet deadline to a current transmit power.

In a specific example, the configuration may indicate a transmit power adjustment value for a number of remaining HARQ attempts (e.g., the transmit power may increase as the number of remaining HARQ attempts decreases). For example, as described, a maximum number of HARQ attempts can be configured for the connection, and the deadline determining component 512 can determine a number of remaining HARQ attempts based on the maximum number of HARQ attempts and a number of HARQ transmissions already performed for the data. For example, the configuration may indicate a transmit power adjustment value for each number of remaining HARQ attempts or for ranges of remaining HARQ attempts. In any case, power adjusting component 518 can determine the transmit power adjustment value associated with the number of remaining HARQ attempts, and can apply the associated transmit power adjustment value to a current transmit power.

In another specific example, the configuration may indicate a transmit power adjustment value for a queue length of a transmission buffer (e.g., the transmit power may increase where the queue length achieves a threshold to improve queue service rate and avoid packet expiration). Thus, for example, deadline determining component 512 can determine the queue length of the transmission buffer at the UE 502. The configuration may indicate a transmit power adjustment value for ranges of queue lengths, and power adjusting component 518 can determine and apply the associated transmit power adjustment value for the packet deadline to a current transmit power.

In yet another example, the configuration may specify to adjust transmit power to a maximum transmit power configured for the UE 502 for one or more given transmission (e.g., HARQ transmission) attempts. In one example, the eNB 504 may convey this to the UE 502 when the UE has less than a threshold number of transmission attempts remaining before the data packet deadline and/or for a certain retransmission index (e.g., a certain value of the transmission counter 516).

The above examples are not to be construed as limiting, and may be performed in conjunction with one another, in one example. In addition, as described, applying the transmit power adjustment value may include multiplying the current transmit power by the transmit power adjustment value, adding the transmit power adjustment value to the current transmit power, setting the current transmit power as the power adjustment value, etc. Also, for example, applying the transmit power adjustment values or otherwise determining a transmit power may also be based on a specified maximum transmit power for the UE 502, such that power adjusting component 518 can adjust up to the maximum transmit power (but not greater than the maximum transmit power).

At Block 612, the UE can transmit the data at the adjusted transmit power. In an aspect, communicating component 361, e.g., in conjunction with processor(s) 503, memory 505, and/or transceiver 506, can transmit the data at the adjusted transmit power. For example, communicating component 361 can adjust a power amplifier and/or one or more RF front end components to achieve the adjusted transmit power. Additionally, for example, transmission indexing component 514 may increment transmission counter 516 after transmitting the data. In an example, where the transmission is a new transmission (e.g., based on the NDI), transmission indexing component 514 can set the transmission counter 516 to 1, and can increment for each retransmission of the packet (if retransmissions occur).

FIG. 7 illustrates an example of a method 700 for configuring (e.g., by an eNB) a configuration for applying transmit power adjustments at a UE. In method 700, blocks indicated as dashed boxes represent optional steps.

At Block 702, the eNB may generate a configuration for adjusting a transmit power for transmission of data over a connection determined to be associated with a threshold reliability. In an aspect, configuring component 302, e.g., in conjunction with processor(s) 553, memory 555, and/or transceiver 556, can generate the configuration for adjusting the transmit power for transmission of data over the connection determined to be associated with a threshold reliability. As described, the configuration can specify one or more transmit power adjustment values for one or more parameters related to a deadline after which transmission of a data packet expires, an indication of whether the packet is a new transmission or a retransmission, based on whether open-loop or closed-loop power control is being utilized, based on TPC interpretation, etc. For example, the configuration can specify one or more transmit power adjustment values for at least one of a number of transmission (e.g., HARQ transmission) attempts (e.g., as a specific value for each attempt or range of attempts, or generally applied for all attempts). For example, the one or more transmit power adjustment values may correspond to possible values of a TPC, as described. In another example, the configuration can specify a time until a data packet deadline (e.g., as a specific value for each of one or more ranges of data packet deadlines), a number of remaining transmission (e.g., HARQ transmission) attempts (e.g., as a specific value for each of one or more ranges of remaining transmission attempts), a queue length of a transmission buffer (e.g., as a specific value for each of one or more ranges of queue lengths), etc. Moreover, as described, the transmit power adjustment value can correspond to a factor to multiple a current transmit power, an increment to the current transmit power, a replacement for the current transmit power, etc. Additionally, the configuration may include a NDI indicating to the UE whether the UE is to transmit a packet as a new transmission or a retransmission. In another example, the configuration, and/or a subsequently provided configuration, may include a TPC, which may be UE-specific, apply to a group of UEs, etc.

At Block 704, the eNB may transmit the configuration to a UE. In an aspect, configuring component 302, e.g., in conjunction with processor(s) 553, memory 555, and/or transceiver 556, can transmit the configuration to the UE 502. For example, configuring component 302 can transmit the configuration to the UE 502 in downlink control information (DCI), as a DCI format, as part of a resource grant related to the connection, a command to activate a component carrier related to the connection, RRC signaling, system information broadcast, etc.

At Block 706, the eNB may receive, from the UE, one or more transmissions at an adjusted (e.g., increased or decreased) transmit power based at least in part on the configuration. In an aspect, transceiver 556, e.g., in conjunction with processor(s) 553, memory 555, etc., can receive, from the UE 502, one or more transmissions at the adjusted transmit power based at least in part on the configuration. As described, the UE 502 can adjust transmit power based on the configuration and one or more parameters associated with a deadline for transmitting a data packet, an NDI received from the eNB 504 (or transmission counter 516 at the UE 502), and/or power control parameters received from the eNB 504 via a system information block (SIB) message or a radio resource control (RRC) message, etc.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for controlling transmit power in wireless communications, comprising:
    determining, at a user equipment (UE), that communications with a base station are configured over a connection associated with a threshold reliability;
    adjusting a configured transmit power to an adjusted transmit power for a transmission attempt over the connection, wherein adjusting the configured transmit power is based at least in part on determining that the connection is associated with the threshold reliability and the configured transmit power is adjusted by a transmit power adjustment value based at least in part on a transmission attempt index for the transmission attempt; and transmitting data at the adjusted transmit power.

2. The method of claim 1, wherein the transmission attempt index corresponds to a new data indicator (NDI) specified by the base station for the data to be transmitted.

3. The method of claim 2, further comprising:
mapping multiple transmit power adjustment values, including the transmit power adjustment value, to possible values for a transmit power control (TPC) command; and
receiving the TPC command from the base station, wherein the configured transmit power is adjusted by the transmit power adjustment value that maps, based on the mapping, to a value indicated in the TPC command.

4. The method of claim 3, wherein the TPC command is a group TPC command for a plurality of UEs, and further comprising determining the transmission attempt index as the NDI indicating a new transmission of the data.

5. The method of claim 3, further comprising:
receiving multiple TPC commands for multiple carriers; and
selecting the TPC command of a primary cell related to one of the multiple carriers.

6. The method of claim 2, further comprising determining the transmission attempt index as the NDI indicating a new transmission of the data based on determining the data is channel state information (CSI) control data.

7. The method of claim 1, wherein the configured transmit power is adjusted by a transmit power adjustment value based at least in part on a packet deadline for transmitting data corresponding to the transmission attempt.

8. The method of claim 1, wherein the configured transmit power is adjusted by a transmit power adjustment value based at least in part on a queue length of a transmission buffer storing data for transmitting to the base station.

9. The method of claim 1, wherein the configured transmit power is adjusted by a transmit power adjustment value based at least in part on a remaining number of transmission attempts available for the UE before expiration of the data.

10. The method of claim 1, further comprising receiving a configuration from the base station for adjusting the configured transmit power, wherein adjusting the configured transmit power is based at least in part on the configuration.

11. The method of claim 10, wherein the configuration indicates to adjust the configured transmit power by a fixed or variable transmit power adjustment value for one or more transmission attempts of the data.

12. The method of claim 11, wherein the configuration indicates to adjust the configured transmit power by a fixed or variable transmit power adjustment value based on at least one of a transmission attempt index of the transmission attempt, a number of remaining transmission attempts, a remaining time until a packet deadline, or a queue length of a transmission buffer.

13. The method of claim 11, wherein the configuration indicates to increase the configured transmit power to a maximum transmit power for retransmission attempts.

14. The method of claim 1, further comprising determining one or more parameters related to a deadline for transmitting the data, wherein adjusting the configured transmit power is based at least in part on the one or more parameters.

15. The method of claim 1, wherein adjusting the configured transmit power is based at least in part on determining that the transmission attempt corresponds to a retransmission attempt for the data.

16. An apparatus for wireless communication, comprising:
a transceiver for communicating one or more wireless signals via one or more antennas;
a memory configured to store instructions; and
one or more processors communicatively coupled with the transceiver and the memory, wherein the one or more processors are configured to:
determine that communications with a base station are configured over a connection associated with a threshold reliability;
adjust a configured transmit power to an adjusted transmit power for a transmission attempt over the connection, wherein adjusting the configured transmit power is based at least in part on determining that the connection is associated with the threshold reliability;
adjust the configured transmit power by a transmit power adjustment value based at least in part on a transmission attempt index for the transmission attempt; and
transmit data at the adjusted transmit power.

17. The apparatus of claim 16, wherein the transmission attempt index corresponds to a new data indicator (NDI) specified by the base station for the data to be transmitted.

18. The apparatus of claim 17, wherein the one or more processors are further configured to:
map multiple transmit power adjustment values, including the transmit power adjustment value, to possible values for a transmit power control (TPC) command; and
receive the TPC command from the base station, wherein the one or more processors are configured to adjust the configured transmit power by the transmit power adjustment value that maps, based on the mapping, to a value indicated in the TPC command.

19. The apparatus of claim 18, wherein the TPC command is a group TPC command for a plurality of UEs, and wherein the one or more processors are further configured to determine the transmission attempt index as the NDI indicating a new transmission of the data.

20. The apparatus of claim 18, wherein the one or more processors are further configured to:
receive multiple TPC commands for multiple carriers; and
select the TPC command of a primary cell related to one of the multiple carriers.

21. The apparatus of claim 17, wherein the one or more processors are further configured to determine the transmission attempt index as the NDI indicating a new transmission of the data based on determining the data is channel state information (CSI) control data.

22. The apparatus of claim 16, wherein the one or more processors are configured to adjust the configured transmit power by a transmit power adjustment value based at least in part on a packet deadline for transmitting data corresponding to the transmission attempt.

23. The apparatus of claim 16, wherein the one or more processors are configured to adjust the configured transmit power by a transmit power adjustment value based at least in part on a queue length of a transmission buffer storing data for transmitting to the base station.

24. The apparatus of claim 16, wherein the one or more processors are configured to adjust the configured transmit power by a transmit power adjustment value based at least in part on a remaining number of transmission attempts available for the UE before expiration of the data.

25. An apparatus for wireless communication, comprising:
- means for determining, at a user equipment (UE), that communications with a base station are configured over a connection associated with a threshold reliability;
- means for adjusting a configured transmit power to an adjusted transmit power for a transmission attempt over the connection, wherein adjusting the configured transmit power is based at least in part on determining that the connection is associated with the threshold reliability;
- means for adjusting the configured transmit power by a transmit power adjustment value based at least in part on a transmission attempt index for the transmission attempt; and
- means for transmitting data at the adjusted transmit power.

26. A non-transitory computer-readable medium, comprising code executable by one or more processors for wireless communications, the code comprising:
- code for determining, at a user equipment (UE), that communications with a base station are configured over a connection associated with a threshold reliability;
- code for adjusting a configured transmit power to an adjusted transmit power for a transmission attempt over the connection, wherein adjusting the configured transmit power is based at least in part on determining that the connection is associated with the threshold reliability;
- code for adjusting adjusts the configured transmit power by a transmit power adjustment value based at least in part on a transmission attempt index for the transmission attempt; and
- code for transmitting data at the adjusted transmit power.

* * * * *

UNITED STATES PATENT AND TRADEMARK OFFICE
CERTIFICATE OF CORRECTION

Page 1 of 1

PATENT NO. : 10,104,624 B2
APPLICATION NO. : 15/650622
DATED : October 16, 2018
INVENTOR(S) : Sundararajan et al.

It is certified that error appears in the above-identified patent and that said Letters Patent is hereby corrected as shown below:

On the Title Page

Item (72) Inventor is corrected to read:
-- Jay Kumar Sundararajan, San Diego, CA (US);
Hao Xu, Beijing, (CN);
Jing Jiang, San Diego, CA (US);
Wanshi Chen, San Diego, CA (US);
Kambiz Azarian Yazdi, San Diego, CA (US) --.

Signed and Sealed this
Fourteenth Day of April, 2020

Andrei Iancu
*Director of the United States Patent and Trademark Office*